SYSTEM FOR SYNCHRONIZING A LOCAL CLOCK GENERATOR WITH BINARY DATA SIGNALS

Filed Nov. 20, 1963 3 Sheets-Sheet 1

INVENTORS
DAVID T. ELLIS
BERNARD KRASNICK

BY Fred Jacob

ATTORNEY

INVENTORS
DAVID T. ELLIS
BERNARD KRASNICK

BY Fred Jacob

ATTORNEY

INVENTORS
DAVID T. ELLIS
BERNARD KRASNICK

BY Fred Jacob

ATTORNEY

United States Patent Office 3,248,664
Patented Apr. 26, 1966

3,248,664
SYSTEM FOR SYNCHRONIZING A LOCAL CLOCK GENERATOR WITH BINARY DATA SIGNALS

Bernard Krasnick, Cochituate, and David T. Ellis, Holliston, Mass., assignors to Honeywell Inc., a corporation of Delaware Filed Nov. 20, 1963, Ser. No. 324,989
12 Claims. (Cl. 331—2)

This invention relates generally to synchronizing systems and more particularly to systems which provide a locally generated clock pulse synchronized with received binary data which contains no specific synchronizing signals.

The use of high speed data processing equipment for all kinds of information and data has expanded to the point where communication between different remotely located portions of an integrated system becomes an essential requirement if the full capabilities of the data processing system are to be realized. In general the information rate of most data processors is higher than that of all but the most premium type of information channels. The interconnection of high speed data processing equipment by means of the relatively narrow band voice and teletype channels now in operation provides an opportunity for the utmost flexibility in interconnecting the equipment and provides for almost all applications an acceptable information rate in conjunction with suitable storage facilities for the data prior to and after transmission. One type of information channel with which the present invention can be used is the Bell System Dataphone Type 202.

In order to conserve the information capacity of the channel where low capacity voice circuits are used for the transmission of the data, it is conventional practice to transmit the information as a binary pulse train without additional synchronization signals. Under these conditions it is necessary to derive the synchronization of the receiving equipment directly from the information content of the message by a determination of the binary transitions and generating a local clock signal which then fits the incoming data train.

The generation of a local signal would be a comparatively simple matter for ideal binary signals where the transistions between the two binary states occur at regularly predictable intervals although the actual pattern of such transitions will be determined by the actual information content of the message. Under the conditions that exist with most message channels, however, and particularly the narrow band channels with which the present invention is intended to be used, distortion in the form of jitter is present in which the occurrence of a transition in the binary pulse train may vary as much as 40 percent or more either before or after the expected or normal transition time. With high percentage jitter distortion, the development of a clock signal which occurs in a position most likely to sample correctly the binary data train and obtain a correct output indicative of the actual state of the bit transmitted for that instant presents a problem of some difficulty. In particular it has been found necessary to provide a phase correction for the generator clock in order to follow the phase variations of the binary signal which variations may occur in a random fashion and thus not be related to the frequency of the binary data rate or require a change in the frequency of the clock generator.

Relatively precise frequency correspondence between the clock generator and the data rate must be maintained, however, and accordingly an average or frequency control for the clock generator must be provided to assure that over a long term message the clock is running at the data rate. Prior art arrangements for providing both phase and frequency control have been relatively complex or relied upon the use of tuned circuits to establish operation corresponding to a particular data rate at the frequency of the tuned circuit.

In accordance with the present invention, a highly stable electromechanical resonator, such as a tuning fork, is employed to determine the nominal frequency of the locally generated clock signal with the normal frequency of the tuning fork selected to correspond to the expected data rate for the received binary signals. With the employment of a high-Q resonator, such as a tuning fork, the stability and frequency accuracy of oscillator circuits associated with such elements are achieved. At the same time the circuit is arranged with a frequency control loop to very the frequency of oscillation of the tuning fork oscillator within narrow limits, but sufficient to accommodate the small frequency variations which may be present in received data rates from diverse sources within a compatible system. Thus if a similar tuning fork is employed at the sending end or at a plurality of sending stations, the receiving equipment will be adjustable in frequency by an amount sufficient to accommodate the slight frequency variations which exist between tuning forks having the same nominal center frequency. To minimize such frequency variations and to conserve equipment, the present system is arranged to utilize the same tuning fork for both transmitting and receiving.

In order to accommodate the jitter or phase distortion which may be present in received signals and to generate the local clock signal at the most advantageous position for sampling the received wave for a decision as to the binary state of each bit, a second generator is employed running in synchronism with the first generator but with variable phase relative thereto. This second generator is phase controlled relative to the transition times of the incoming data and maintains a fixed phase relation with the transition times of the incoming data irrespective of the exact pattern of the binary transitions present in an information bearing message. This phase relation, however, is rapidly adjustable to conform the locally generated clock to the average phase of the data while the cumulative effect of a consistent phase error which requires consistent correction is presented as a frequency error to the frequency control loop for the primary tuning fork stabilized oscillator thereby adjusting its frequency to conform to the actual data rate while the phase of the local clock is made to conform to the phase of the data transitions to provide both long term and short term stability in the frequency and phase of the locally generated clock relative to the full range of variations encountered in the incoming data.

The principal object of the present invention is, accordingly, to provide a locally generated clock synchronized with received binary data signals which employs the advantages of a high-Q electromechanical resonator in the reference oscillator.

A feature of the invention is the provision of a second generator phase adjustable with respect to the electromechanically stabilized generator to permit relatively rapid phase changes to be made in order to follow accurately fluctuations in the phase or data rate of the incoming data without sacrificing the stability and accuracy inherent in the electromechanically stabilized primary generator. A further feature of the invention is the provision of a rapid acquisition mode upon the initial reception of each message signal to accommodate the acquisition by the phase controlled generator of the particular phase of an incoming message prior to the reception of actual information bearing bits. Still another feature is the provision of a circuit for sensing the lack of oscillation in the tuning fork oscillator of the primary generator and the substitution of a linear feedback loop for the pulse feedback frequency adjusting loop normally operative on the tuning fork thereby to insure starting of the tuning fork to generate signals which can then be employed in a pulse feedback loop for frequency control of the primary generator.

Additional objects of the invention are the provision of simple and reliable circuits having the foregoing features and advantages while overcoming the disadvantages of the prior art and which are capable of economical manufacture and performance under a wide variety of conditions without any substantial attention or maintenance.

Other objects and features of the invention will be apparent from the following detailed description taken in conjunction with the accompanying drawings wherein.

Figure 1:
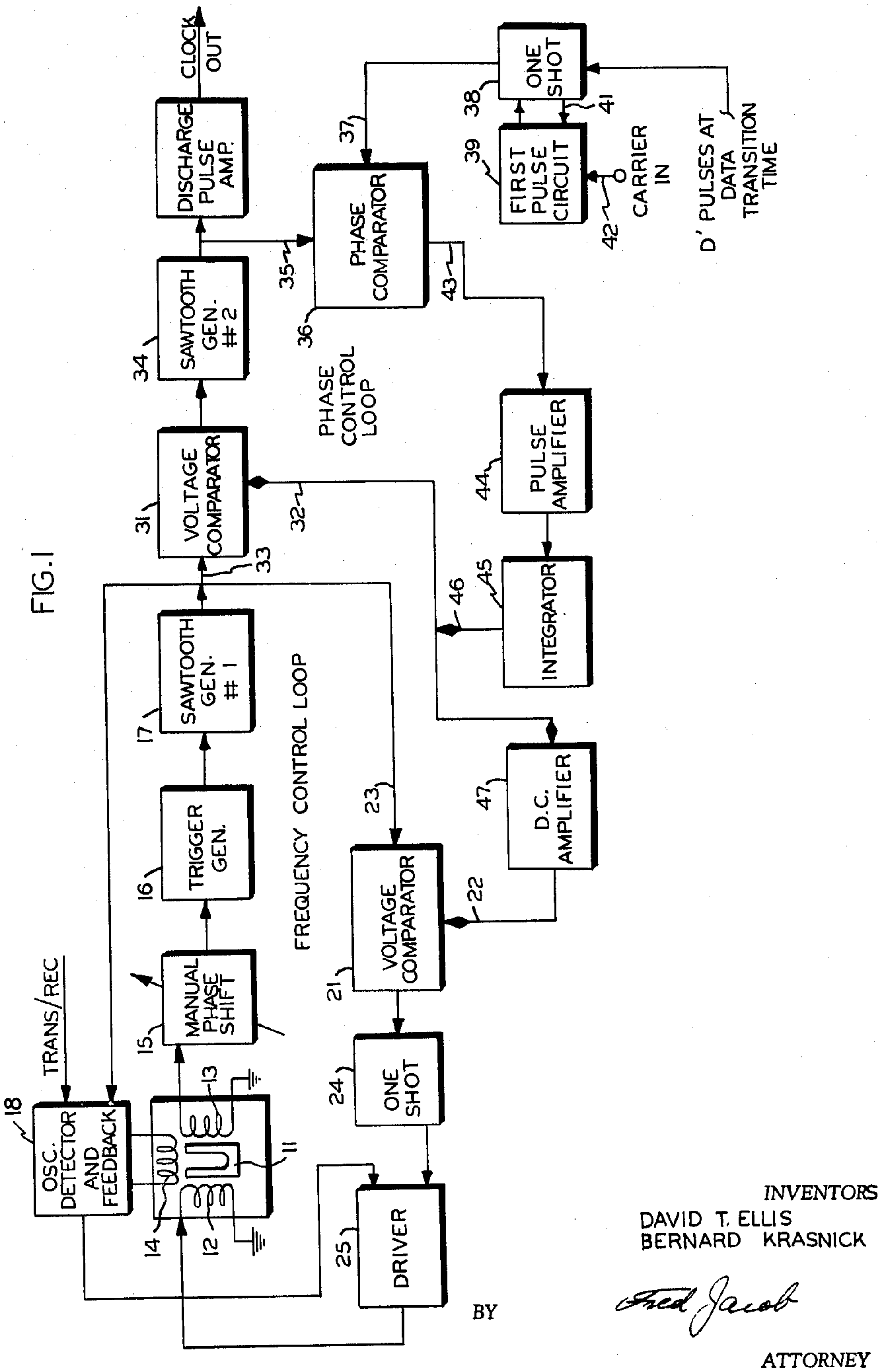
FIG. 1 is a block diagram of a system in accordance with the invention.

Referring now to FIG. 1, the system is arranged to generate a primary frequency which is determined by a high-Q electromechanical resonator, such as tuning fork 11. The tuning fork 11 has a drive coil 12, a pickup coil 13 and an auxiliary control coil 14. When the tuning fork 11 is oscillating sinusoidal signals are induced in the pickup coil 13 and applied to an adjustable phase shift circuit 15. The output of phase shifter 15 is applied to a trigger generator 16 which generates an output trigger pulse at a precise point in each sine wave of the sinusoidal input from phase shifter 15. The output of the trigger generator 16 is aplied to a sawtooth generator 17. The sawtooth generator 17 may be a relaxation oscillator of the capacitor charge and discharge type with the discharge being triggered by the pulse output of the trigger generator 16 and the linear voltage rise on the capacitor occurring between trigger pulses. The output of the sawtooth generator 17 is applied to an oscillation detector and feedback circuit 18 which will be described in detail in connection with FIG. 3. The output of the feedback circuit 18 is applied to the driver 25 and thence to drive coil 12 of the tuning fork 11.

The output of the sawtooth generator 17 is applied by lead 23 to a voltage comparator 21 where the voltage on the linear portion of the sawtooth is compared with a second input on lead 22. The voltage comparator 21 is any suitable conventional circuit which produces an output pulse when a predetermined relation exists between the voltage level on the lead 22 and the sawtooth voltage input from generator 17. Generally when the sawtooth wave on input 23 equals the voltage level existing on input 22 the output pulse occurs. The output of the voltage comparator 21 is applied to a one-shot 24 which generates a pulse of fixed amplitude and width each time it is triggered by an output from the voltage comparator 21. The output of the one-shot 24 is applied to a driver amplifier 25 which transforms the pulse in magnitude and impedance level to a suitable form for application to the drive coil 12 of the tuning fork 11.

The circuit just described comprises the primary electromechanical resonator stabilized oscillation generator system and its operation will be briefly described. When the tuning fork 11 is oscillating the sinusoidal wave induced in coil 13 is applied after suitable selected phase shift in phase shifter 15 to the trigger generator 16 where a precise trigger pulse is produced to trigger the sawtooth generator 17. The linear rise of the sawtooth wave on lead 23 is compared with the voltage level on lead 22 in the voltage comparator 21 to produce an output pulse to the one-shot 24 which is variable in phase with respect to the sawtooth wave generated by the sawtooth generator 17 depending upon the voltage level on lead 22. Thus if the voltage level on lead 22 is low the output pulse of the voltage comparator 21 will be produced after a short portion of the sawtooth rise has occurred whereas if the voltage on lead 22 is relatively large a substantial portion of the sawtooth linear rise will occur before the voltage on lead 23 equals the voltage on lead 22 to produce the output of the comparator 21. Thus the one-shot pulse from generator 24 and its amplified version from the driver 25 will be applied to the drive coil 12 from the tuning fork 11 with a variable phase relative to the oscillations of the tuning fork 11 as determined by the voltage level on lead 22. This variation in phase of the pulse drive for the tuning fork 11 is capable of producing a slight frequency variation above and below the nominal center frequency of the tuning fork 11 and hence the phase controlled driving pulse is useful as a frequency adjustment for the primary frequency generator as determined by the voltage on lead 22.

The sawtooth wave from the generator 17 is also applied to a second voltage comparator 31. The voltage comparator 31 has two input leads 33 and 32 and produces an output pulse when a predetermined condition obtains between the voltages on leads 32 and 33 in a manner similar to the voltage comparator 21. Typically, this output will occur when the voltages are equal and, hence, the output of the voltage comparator 31 will be variable in phase relative to the sawtooth wave from the generator 17 which is applied on input 33. The output of the voltage comparator 31 is applied to trigger a second sawtooth generator 34 and, due to the variable phase of the trigger applied to the sawtooth generator 34 from the voltage comparator 32, the second sawtooth generator 34 produces a second sawtooth wave which varies in phase relative to the sawtooth wave from generator 17 in accordance with the voltage level on the lead 32.

The output of the sawtooth generator 34 is applied as one input 35 of the phase comparator 36, the second input 37 of which is derived from the data transitions of the received binary signal. In the normal mode the signal on lead 37 is a pulse of fixed width derived from a one-shot 38 which is triggered by a differentiated data (D′) signal which occurs for each transition of the data, both positive and negative, in the binary signal. The details of features such as the D′ generator are shown in the application of Krasnick et al. Serial No. 298,823, filed July 31, 1963 and hereby incorporated by reference in this application. The width of the pulse generated by one-shot 38 is controllable during the acquisition mode in a manner to be hereinafter described by first pulse circuit 39 which operates in response to a D′ triggered signal applied on lead 41 and a carrier detected signal on lead 42.

The phase comparator 36 is any conventional circuit for producing bipolar output signals on lead 43 which vary in amplitude and sense in accordance with the phase difference between the signals on the two input leads 35 and 37. Thus one suitable circuit comprises a bridge as disclosed in the above-referenced Krasnick et al. application to which a sawtooth as on lead 35 is applied and a pulse as applied on lead 37 is effective to produce an output on lead 43 corresponding to the instantaneous voltage relative to the mid-point of the sawtooth wave at the time of the pulse on lead 37. Thus if the pulse on lead 37 occurs before the mid-point of the sawtooth, the output on lead 43 will have an amplitude determined by the position on the sawtooth and will be negative relative to signals produced if the pulse on lead 37 occurs after the mid-point of the sawtooth on lead 35. Thus the output on lead 43 is a signal which represents in magnitude and sense the relative phase between the signals on leads 35 and 37.

The output on lead 43 is suitably amplified in an amplifier 44 and integrated in an integrator 45 to produce an output voltage level on lead 46 which is proportional to the time average of the phase error between the signals on the leads 35 and 37. This voltage level can be positive or negative with respect to the mid-point of the linear rise of the sawtooth wave from generator 17 and hence is effective to control the time of occurrence of the output pulse from the voltage comparator 31 to be either before or after the mid-point of the linear voltage rise of the generator 17. For this purpose the output on lead 46 of the integrator 45 is applied with suitable amplification, if necessary, to the input lead 32 of the comparator 31. The signal on lead 46 is also applied with additional amplification provided by D.C. amplifier 47 to provide the voltage level on lead 22 to the voltage comparator 21. The output of the D.C. amplifier 47 is thus a substantially amplified replica of the signal on the lead 46 from the integrator 45 and provides a substantial increase in sensitivity for frequency control provided by the output of voltage comparator 21. The output of the D.C. amplifier 47 is both positive and negative with respect to the mid-point of the linear voltage rise from the sawtooth generator 17 applied on lead 23 but is suitably limited to have maximum and minimum excursions corresponding to the maximum effective frequency control which can be obtained by phase displacing the output of the one-shot 24 as applied to the drive coil 12 of the tuning fork 11.

The operation of the phase control loop will now be briefly described. The sawtooth wave generated by the generator 34 is produced in response to a trigger signal from the voltage comparator 31 and hence is synchronized but has variable phase relative to the phase of the tuning fork 11 and the sawtooth wave generated by the generator 17. The phase of the sawtooth from the generator 34 is determined by a phase comparison of the output of generator 34 with the data transitions of the incoming binary signal by means of phase comparator 36. Any difference in phase between the incoming data transitions and the mid-point of the linear rise of the sawtooth generated by generator 34 produces a phase control signal on lead 43 which is integrated in integrator 45 to change the voltage level applied in input 32 of the comparator 31 thereby varying the phase of sawtooth generator 34. This control of the phase of generator 34 is immediately effective to reduce the phase difference between the data transitions and the mid-point of the linear rise of the sawtooth generator 34 to substantially zero and the small residual error signal for this condition after amplification in D.C. amplifier 47 is available on lead 22 to maintain the frequency of the tuning fork oscillator 11 at the value which corresponds to the actual long-term data rate of the incoming binary signal. As jitter or other phase changes occur in the incoming data transitions an error signal is developed on lead 43 which adjusts the sawtooth generator 34 to again obtain a phase correspondence between the data transitions and the mid-point of the sawtooth wave from generator 34. For random jitter variations or short-term phase error no substantial frequency adjustment occurs due to the high-Q characteristics of the tuning fork resonator which is slow to respond to error signal input. For sustained phase error, a frequency error is indicated and accordingly over the long term the integrated phase error will be applied long enough to produce the desired frequency correction in tuning fork 11. When operating at the correct frequency corresponding to the average data rate, the output of the D.C. amplifier 47 becomes stabilized to the point where the frequency control loop is in equilibrium.

Figure 2:
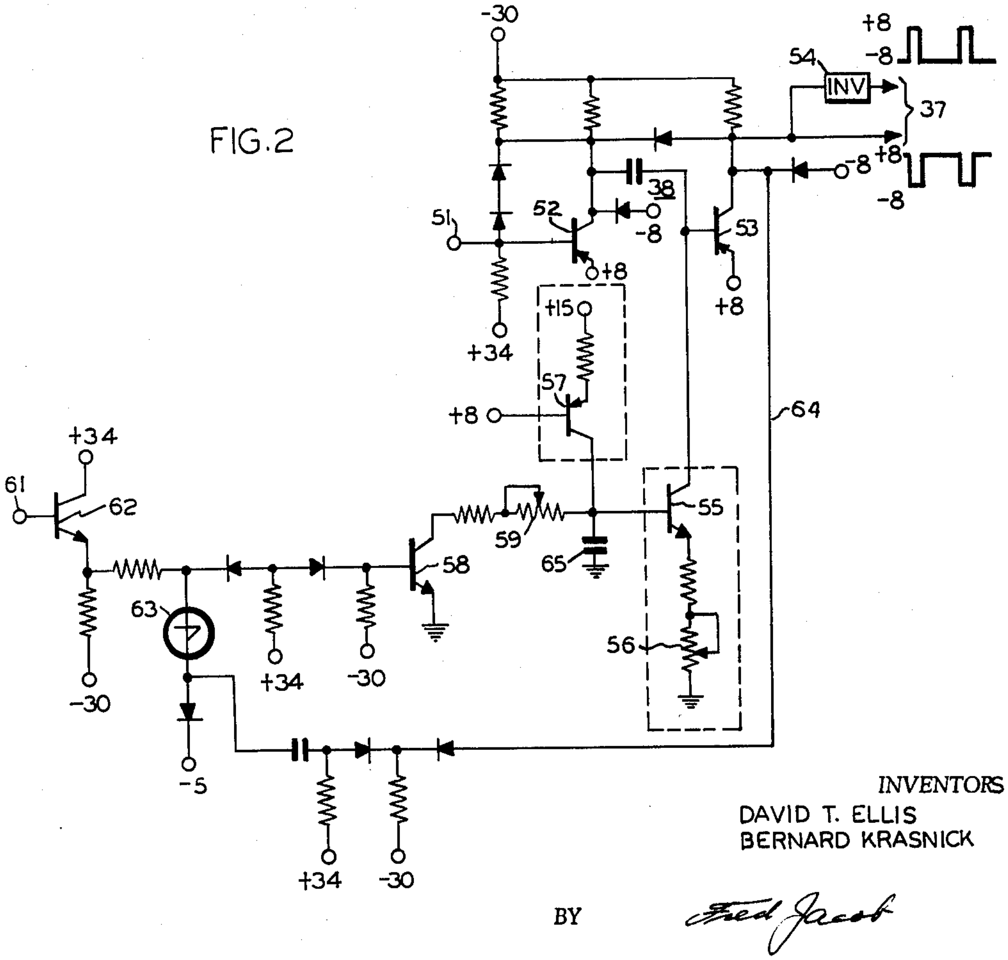
FIG. 2 is a schematic wiring diagram of a portion of the system showing a circuit for proving an acquisition mode which produces a rapid phase and frequency correction during the initially received portion of a message.

Referring now to FIG. 2 a schematic circuit showing the details of the first-pulse-responsive acquisition mode circuit associated with the first pulse circuit 39 and the one-shot 38 of FIG. 1 will now be described. The D′ pulses occurring at each data transition are applied at input terminal 51 and these negative pulses are effective to trigger the one-shot 38 comprising transistors 52 and 53. The output of the one-shot 38 is taken from the collector of transistor 53 as a negative pulse and, through an inverter 54, as a positive pulse to apply phase opposed signal pulses to the phase comparator 36 by means of coupling 37 as indicated.

The width of the pulses produced by the one-shot 38 is determined by the current drawn through the collector-emitter path of a transistor 55 which includes an adjustable resistor 56 to ground. The resistor 56 can be adjusted when the transistor 55 is fully conducting to establish the normal 10 microsecond width for the pulse output of the one-shot 38. The conductive condition of the transistor 55 is determined by the voltage on its base which is established from a fixed current source through a transistor 57 and a switch transistor 58. With both transistors 57 and 58 conducting the current flow through the emitter-collector paths thereof is determined by the resistance of the path from the positive 15 volt supply through the collector-emitter paths of both transistors 57, 58 and 59 to ground. Adjustment of this resistor 59 is thus available to establish the base voltage for transistor 55 when both transistors 57 and 58 are conducting thereby determining the minimum value of current for transistor 55 which corresponds to the maximum pulse width for the one-shot 38.

In order to provide a wide pulse output from the one-shot 38 during the acquisition mode with a gradual decrease in the width of the one-shot pulse to the normal 10 microsecond width condition, transistor 58 is controlled by the circuit now to be described. The detection of the carrier of a received signal produces at terminal 61 a change from −8 to +8 volts which is transferred through an emitter follower 62 to produce effectively a 13 volt potential across the four layer Shockley diode 63. This potential is insufficient to fire the Shockley diode 63 but does apply a positive voltage to the base of transistor 58 thereby making it fully conductive and reduces the voltage on the base of transistor 55 to condition the one-shot 38 for wide pulse output. Within a short time of the detection of the carrier the first data pulses will be received and the first such data transition fires the one-shot 38 which produces a wide output pulse due to the low current condition of transistor 55. The output pulse is coupled on lead 64 to the cathode terminal of the Shockley diode 63. This pulse is negative with an amplitude of 16 volts and is coupled to combine with the 13 volts already across the Shockley diode 63 producing sufficient voltage to fire Shockley diode 63. The diode 63 becomes effectively a short circuit and the negative 5 volt supply is effective to cut off the transistor 58 thereby permitting the current through transistor 57 to build up voltage on a capacitor 65. This rise is substantially linear and controls in a linear fashion the voltage on the base of transistor 55 until it approaches a positive eight volt level. During this rise the current carried by transistor 55 increases in an approximately linear manner thereby decreasing the width of the pulse output of the one-shot 38 to the normal value of ten microseconds. This condition prevails as long as data is received.

After the end of a transmission the CARRIER-ON signal at terminal 61 changes from +8 to −8 volts and the −8 volts on the Shockley diode 63 causes it to cut off and become an open circuit. The effect on transistor 58 is merely to change its base voltage from −5 to −8 volts, however, and accordingly transistor 58 remains cut-off until the next CARRIER-ON signal is received. With the reception of a CARRIER-ON signal, transistor 58 is switched to conduction thereby conditioning the one-shot 38 for wide output as previously described and thereafter the first data pulse fires the Shockley diode 63 to start the gradual reduction of the pulse width of the one-shot 38 to its normal value all as above described.

Figure 3:
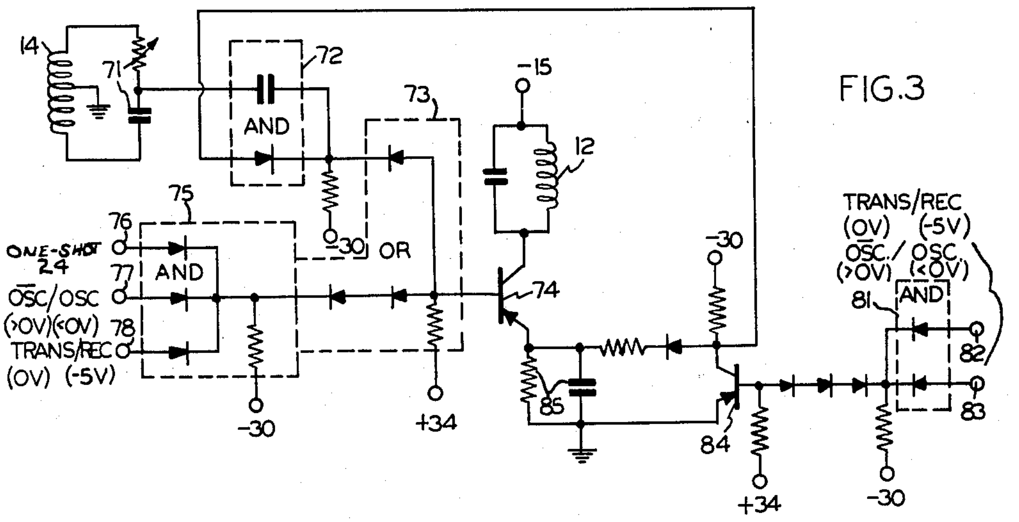
FIG. 3 is a schematic wiring diagram of a portion of the system showing a circuit for insuring the initiation of oscillation in the tuning fork oscillator in the event that oscillations do not build up during normal operation.

Referring now to FIG. 3 the circuit details for insuring oscillation in the tuning fork oscillator 11 during reception of signals and for utilizing this oscillator during transmission will be described. The auxiliary pick-up coil 14 is coupled through a phase shift circuit 71 to an input of AND 72 the output of which supplies one input of an OR 73 the output of which is applied to the base of a transistor 74. The transistor 74 constitutes the driver 25 of FIG. 1 and supplies the drive current to the drive coil 12 to make the tuning fork 11 oscillate. The other input of OR 73 is the output of an AND 75 the three inputs of which are:

(1) At terminal 76; the pulse output of one-shot 24
(2) At terminal 77; a voltage derived from the sawtooth generator 17 which is greater than zero if the tuning fork is not oscillating and is less than zero if the tuning fork is oscillating and
(3) At terminal 78; a voltage which is zero when the system is employed to transmit information and which is —5 volts when the system is used as a receiver for receiving incoming information.

The AND 75 produces an output only if all signals to terminals 76, 77 and 78 are negative and if any one of these terminals is not negative the AND does not produce an output which will pass through OR 73.

Another AND 81 has an input terminal 82 subject to the same signal conditions as terminal 78 and an input terminal 83 subject to the same input conditions as terminal 77. The output of the AND 81 is applied to the base of a transistor 84 and is effective to make the transistor 84 nonconductive whenever either of the inputs 82 or 83 is zero volts or greater than zero volts but makes the transistor 84 conductive whenever both of the inputs 82 and 83 are negative. The transistor 84 is connected to control the emitter bias on transistor 74 and when transistor 84 is conducting emitter bias on transistor 74 is substantially zero. Also for transistor 84 conducting substantially zero volts is applied as the second input to AND 72 and conversely when transistor 84 is open-circuited the input to the AND 72 is a negative voltage and the bias on transistor 74 develops across the resistor-capacitor bias circuit 85 to bias the transistor 74 in a substantially class AB condition.

The operation of the circuit of FIG. 3 will now be described. When the system is transmitting the inputs to the AND gates 75 and 81 are such that the drive signal at terminal 76 is not transmitted to the input of OR 73 and the transistor 84 is nonconductive due to the absence of a negative output from AND 81. This condition supplies a negative input to AND 72 which enables it to pass the output of auxiliary coil 14 to the input of OR 73 which applies it to the base of transistor 74 thus completing the feedback loop between the auxiliary coil 14 and the drive coil 12. For this condition the transistor 74 is signal biased and operates in an overdriven state at approximately the class AB condition. Oscillations in the tuning fork are thus assured during transmission.

In the receiving mode and for the condition in which the fork is not oscillating the sequence similar to that described for transmission takes place in which the auxiliary coil 14 is connected to drive coil 12 in an overdriven class AB condition feedback loop. As soon as the fork 11 starts oscillating the sawtooth generator 17 produces a sawtooth wave output from which are derived the oscillating condition voltages on terminals 77 and 83, both of which become less than zero during generation of the sawtooth wave in generator 17. This satisfies both inputs 77 and 78 of the AND 75 and hence when the negative pulses of the one-shot 24 appear at the terminal 76 they are transmitted to the OR 73 and hence to transistor 74 to drive the tuning fork drive coil 12. At the same time the presence of oscillations satisfies the input 83 of the AND 81 to make transistor 84 conductive thereby establishing a zero emitter bias for the transistor 74 enabling it to amplify the negative pulse signals now appearing at its base and applying a grounded input to the AND 72 thereby interrupting passage of the auxiliary coil 14 signals to the other input of OR 73. Thus the class AB feedback loop is interrupted and the pulse feedback loop originating from coil 13 and terminating at coil 12 is established and the consequent frequency control of the fork can be effected as previously described.

Figure 4:
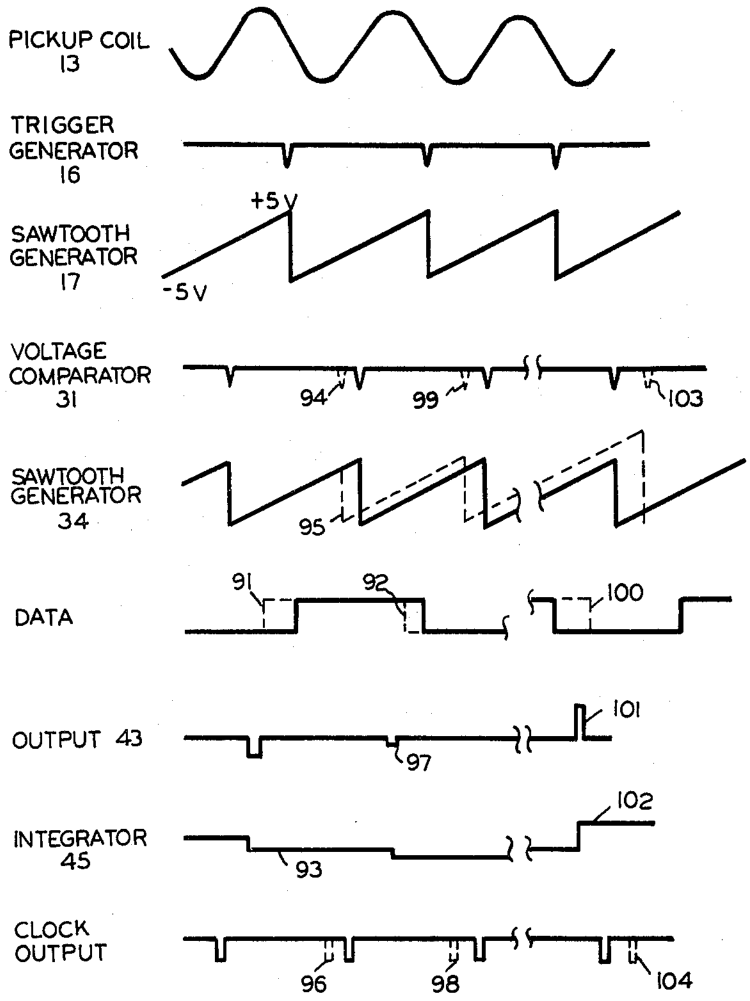
FIG. 4 is a waveform diagram useful in understanding the operation of the system.

Referring now to FIG. 4 a description of the operation of the system will be given. Oscillations of the tuning fork 11 produce a sinusoidal wave in coil 13 which is translated by generator 16 into the trigger waveform shown. This triggers the discharge of sawtooth generator 17 as indicated. The sawtooth linear rise of sawtooth generator 17 goes from —5 to +5 volts and then is discharged back to —5 volts at the time of the trigger pulse from generator 16. It will be understood that a suitable phase for the trigger pulse from generator 16 may be obtained relative to the sine wave from coil 13 by means of the phase shifter 15. The sawtooth from generator 17 is applied to comparator 31 and, assuming that a zero volt input on lead 32 exists, the output of the voltage comparator will be the trigger pulses as shown in FIG. 4 with a trigger pulse each time the sawtooth wave from generator 17 crosses the zero axis. The triggers from comparator 31 discharge sawtooth generator 34 which has a linear rise between —5 and +5 volts terminated by the discharge in reponse to the trigger from the comparator 31. This discharge occurs at the mid-point of the data bit interval which is the most probable time for sampling a correct ZERO or ONE in the binary data.

Assuming that transitions occur early as indicated in FIG. 4 at 91 and 92 the sampling pulse on lead 37 into the phase comparator 36 results in a negative output on lead 43 as indicated in FIG. 4. This negative output is effective immediately to change the output of integrator 45 from the normal zero volts to the negative value 93 and this negative value into the comparator 31 produces an output 94 which is earlier than normal thereby discharging the sawtooth generator 34 at 95 before its normal position which is indicated by the solid line waveform. The discharge 95 results in a change in the clock output at 96 which is in the direction to move the sampling of the data toward the center of the bit interval for its displaced condition indicated at 91, 92. The early transition 92 finds the phase of the sawtooth generator 34 approximately correct and only the small correction 97 is added to the integrator 45 with the result output pulse 99 produces a clock output 98 which is approximately centered with respect to the bit interval which starts with the transition 92.

The corresponding sequence of events of the opposite sense occurs for a late transition 100 which results in output 43 being positive as indicated at 101 and a positive output from integrator 45 indicated at 102. This positive input to the comparator 31 delays the output therefrom indicated at 103 with the corresponding discharge of sawtooth generator 34 and coincident clock output 104 moving in the direction to approach the center of the bit interval for the late transition 100. Thus phase corrections in both directions are accomplished rapidly. The cumulative effect of these phase corrections is operative on the tuning fork 11, which has a slow response to such signals, to produce a frequency change if the average phase error is non-zero over a time interval corresponding to that required to adjust the frequency of the fork 11.

While a particular arrangement has been disclosed as a preferred embodiment of the present invention it will be understood that many changes and variations are possible within the scope of the invention as defined in the appended claims.

We claim:

1. A communications synchronizer for received binary signals comprising a first high-Q electromechanically stabilized oscillator having a frequency adjustable within narrow limits corresponding to the bit rate of said signals, a second oscillator triggered to oscillate in accordance with the frequency of said first oscillator and with adjustable phase relative to said first oscillator, means responsive to the output of said second oscillator and received binary signals for altering the phase of said second oscillator to maintain a predetermined phase relation between said output and said binary signals, means responsive to sustained deviation from said predetermined phase relation for changing the frequency of said first oscillator to correspond to said bit rate, and means for obtaining a synchronizing signal output from said second oscillator.

2. A pulse communication synchronizer for received binary signals having a bit interval determined by regular nominal transition times comprising means for detecting binary transitions of said binary signals, a tuning fork oscillator circuit having a feedback loop for driving said fork with feedback signals, first control means for adjusting the phase of said feedback signals to vary the frequency of said oscillator within narrow limits, a second oscillator, second control means for adjusting the phase of said second oscillator relative to the output of said tuning fork oscillator, means for comparing the output of said second oscillator with said binary transitions and deriving a control signal representative of the phase difference therebetween, means for applying said control signal to said second control means to produce a predetermined phase relation between said second oscillator and said transition times, and means responsive to said control signal for controlling said first control means to make the frequency of said tuning fork oscillator correspond to the average bit interval.

3. Apparatus according to claim 2 and including means responsive to the initial reception of binary signals for increasing the magnitude of phase collection produced by said control signal on said second oscillator for a limited interval after said initial reception.

4. A pulse communication synchronizer for received binary signals having a bit interval determined by regular nominal transition times comprising means for detecting binary transitions of said binary signals, a tuning fork oscillator circuit, means for deriving a pulse output from the oscillations of said tuning fork, means for applying said pulse output to drive said tuning fork, first control means for adjusting the phase of said pulse output to vary the frequency of said tuning fork within narrow limits, a second oscillator, second control means for adjusting the phase of said second oscillator relative to the output of said tuning fork oscillator, means for comparing the output of said second oscillator with said binary transitions and deriving a control signal representative of the phase difference therebetween, means for applying said control signal to said second control means to produce a predetermined phase relation between said second oscillator and said transition times, and means responsive to said control signal for controlling said first control means to make the frequency of said tuning fork oscillator correspond to the average bit interval.

5. Apparatus according to claim 4 and including means responsive to failure of oscillation of said tuning fork with said pulse output driving said tuning fork for completing an auxiliary oscillatory feedback loop to start said tuning fork into oscillation, and means responsive to sustained oscillations of said tuning fork for interrupting said auxiliary feedback loop.

6. Apparatus according to claim 5 in which said pulse output is applied to a first driving coil of said tuning fork, the output oscillations of said tuning fork are obtained from an output coil on said tuning fork and the auxiliary feedback loop signals are applied to a second driving coil on said tuning fork.

7. A pulse communication synchronizer for received binary signals having a bit interval determined by regular nominal transition times comprising means for detecting binary transitions of said binary signals, a tuning fork oscillator circuit, a first sawtooth wave generator triggered in fixed phase with the output of said tuning fork oscillator, a first voltage comparator responsive to said first sawtooth wave and a first reference voltage input for producing an output at a time on said first sawtooth wave corresponding to said first reference voltage input, a pulse generator triggered by said output of said first voltage comparator, means for driving said tuning fork with the output of said pulse generator, a second voltage comparator responsive to said first sawtooth wave and a second reference voltage input for producing an output at a time on said first sawtooth wave corresponding to said second reference voltage input, a second sawtooth wave generator triggered by said output of said second voltage comparator, a phase comparator responsive to said second sawtooth wave and detected transitions of said binary signals for producing a phase error signal that corresponds in magnitude and sense to the phase difference between said transitions and the mid-point of said second sawtooth wave, means responsive to said phase error signal for producing said first and second reference voltage inputs in accordance with the magnitude and sense of said phase error signal, and means for deriving an output signal in fixed phase synchronization with said second sawtooth wave.

8. Apparatus according to claim 7 in which said means responsive to said phase error signal includes an integrator for integrating said phase error signal and said reference voltage inputs are derived from the integrated phase error signal.

9. Apparatus according to claim 8 and including means for amplifying the output of said integrator and applying a substantially amplified signal proportional to said integrated phase error signal as said first reference voltage input to said first voltage comparator.

10. Apparatus according to claim 9 and including means responsive to failure of oscillation of said tuning fork with said pulse output driving said tuning fork for completing an auxiliary oscillatory feedback loop to start said tuning fork into oscillation, and means responsive to sustained oscillations of said tuning fork for interrupting said auxiliary feedback loop.

11. Apparatus according to claim 10 and including means selectively operable for transmission of binary signals for completing said auxiliary oscillatory feedback loop to produce oscillations which determine the bit interval for the transmitted binary signals and disabling the means for interrupting said auxiliary feedback loop.

12. A pulse communication synchronizer for received binary signals having a bit interval determined by regular nominal transition times comprising means for detecting binary transitions of said binary signals, a tuning fork oscillator circuit, a first sawtooth wave generator triggered in fixed phase with the output of said tuning fork oscillator, a voltage comparator responsive to said first sawtooth wave and a reference voltage input for producing an output at a time on said first sawtooth wave corresponding to said reference voltage input, a pulse generator triggered by said output of said voltage comparator, means for driving said tuning fork with the output of said pulse generator, a second sawtooth wave generator triggered in synchronism with said first sawtooth wave, a phase comparator responsive to said second sawtooth wave and detected transitions of said binary signals for producing a phase error signal that corresponds in magnitude and sense to the phase difference between said transitions and the mid-point of said second sawtooth wave, means responsive to said phase error signal for changing the phase of said second sawtooth generator relative to said first sawtooth generator and in a sense to reduce said phase error signal, means for integrating said phase error signal, means for applying a voltage proportional to the integrated phase error signal as said reference voltage of said voltage comparator, and means for deriving an output signal in fixed phase synchronization with said second sawtooth wave.

No references cited.

ROY LAKE, *Primary Examiner.*

S. H. GRIMM, *Assistant Examiner.*